US008428595B2

United States Patent
Kazmi

(10) Patent No.: US 8,428,595 B2
(45) Date of Patent: Apr. 23, 2013

(54) METHODS AND ARRANGMENTS FOR DYNAMICALLY ADJUSTING THE RATE OF SUB CELL SEARCHING IN COORDINATED MULTIPLE POINT TRANSMISSION/RECEPTION, COMP, CELLS

(75) Inventor: Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 13/121,578

(22) PCT Filed: Sep. 30, 2008

(86) PCT No.: PCT/SE2008/051099
§ 371 (c)(1),
(2), (4) Date: Mar. 29, 2011

(87) PCT Pub. No.: WO2010/039066
PCT Pub. Date: Apr. 8, 2010

(65) Prior Publication Data
US 2011/0183669 A1 Jul. 28, 2011

(51) Int. Cl.
*H04W 36/00* (2009.01)
(52) U.S. Cl.
USPC .......................................... 455/436; 455/442
(58) Field of Classification Search .......... 455/436–444, 455/435.1–435.3
See application file for complete search history.

(56) References Cited

U.S. PATENT DOCUMENTS 8,031,679 B2 * 10/2011 Shaik et al. .................... 370/334
2008/0198808 A1 8/2008 Hwang et al.

FOREIGN PATENT DOCUMENTS

| EP | 1424862 A1 | 6/2004 |
| EP | 1655981 A2 | 5/2006 |
| EP | 1962536 A1 | 8/2008 |

OTHER PUBLICATIONS

Huawei, CMCC, RITT; "CoMP clarification of definitions and TP"; 3GPP TSG RAN WG1#54 bis; Sep. 29-Oct. 3, 2008; pp. 1-6; R1-083906; 3GPP, Prague, Czech Republic.
Motorola; "LTE—A Multiple Point Coordination and Its Classification"; TSG-RAN WG1 #54; Aug. 18-22, 2008; pp. 1-6; R1-083229; 3GPP, Jeju, South Korea.

* cited by examiner

*Primary Examiner* — Steven Lim
(74) *Attorney, Agent, or Firm* — Coats & Bennett, P.L.L.C.

(57) ABSTRACT

The present invention relates to methods and arrangements that enable a User Equipment UE to limit the number of sub cell searches needed in a wireless communication system with Coordinated Multiple Point transmission/reception (CoMP) cells, while keeping an acceptable system performance at handovers. This is achieved by a solution where the UE does sub cell search in a candidate target CoMP cell only when the candidate target CoMP cell quality performance is within a reasonable range or when the serving CoMP cell quality performance is low.

24 Claims, 6 Drawing Sheets

METHODS AND ARRANGMENTS FOR DYNAMICALLY ADJUSTING THE RATE OF SUB CELL SEARCHING IN COORDINATED MULTIPLE POINT TRANSMISSION/RECEPTION, COMP, CELLS

TECHNICAL FIELD

The present invention relates to the area of wireless communication, and especially to the area of cell search in coordinated multiple point transmission and reception (CoMP) systems.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency and lowered costs. UMTS Terrestrial Radio Access Network (UTRAN) is the radio access network of a UMTS system and evolved UTRAN (E-UTRAN) is the radio access network of an LTE system. However the evolution continues, and a study item on advanced E-UTRAN, hereinafter referred to as LTE-advanced, has recently been approved within 3GPP.

One of several objectives of LTE-advanced, is to increase the spectral efficiency and the system/user throughput, especially at the cell edge. The earlier systems, such as UTRAN and E-UTRAN, which uses orthogonal frequency division multiple access (OFDMA), are basically reuse-1 systems, where adjacent base station sites use the same frequencies, thus allowing efficient use of sparse spectrum resource. But reuse-1 also leads to inter-cell interference, which is mitigated by employing advanced receivers at the base station and at the user equipment (UE). In an LTE-advanced system, the inter-cell interference is expected to be restricted by architectural means in addition to traditional means based on advanced receivers. One such arrangement to be employed in LTE-advanced is called coordinated multiple point transmission/reception (CoMP) system. Another term for CoMP systems, commonly used in the literature, is distributed antenna systems (DAS), but the term CoMP system will be used hereinafter. The introduction of CoMP systems will also impact other processes such as cell search and measurements required for performing cell reselection and handover.

A CoMP system is a network of spatially separated antenna nodes or remote antenna units connected to a common source via a transport network, that provides wireless service within a geographic area. The remote antenna units will hereinafter be referred to as sub base stations. FIG. 1 illustrates the basic concepts of a conventional CoMP system. A controlling unit 110 coordinates the function of all the sub base stations 130. This controlling unit 110 can e.g. be placed in a base station or in a separate centralized controller. The sub base stations 130 within a CoMP system can be passive amplifiers but they can also contain full signal processing capability (i.e. a transceiver). The sub base stations 130 are all tightly synchronized. The area covered by each sub base station 130 is hereinafter referred to as a sub cell 120. Similarly the area covered by a CoMP system will be referred to as a CoMP cell 140.

In LTE-advanced, where CoMP is considered to be an important architecture, each sub base station 130 can be realized by reusing the E-UTRAN base station (eNodeB) in order to ensure the backward compatibility with E-UTRAN. This implies that one CoMP cell could comprise of a set of eNodeBs.

The basic idea with CoMP is to split the transmitted power of a traditional base station among several sub base stations separated in space so as to provide coverage over the same area as the traditional base station but with reduced total power. This leads to a reduction of the inter-cell interference. Typically the UE receives signals from more than one sub base station in a CoMP cell. In other words multiple sub cells 120 serve one UE 150 which will improve the reliability thanks to the diversity gain. Since the sub base stations are all synchronized, the UE will receive data transparently and coherently.

Cell search is a procedure by which the UE finds a cell to potentially connect to in a wireless communication system. Cell search, cell identification and cell detection, which are commonly used terms in mobile communication, all have the same meaning. For consistency reasons cell search and cell search delay will hereinafter be used. As part of the cell search procedure, the UE measures e.g. the reference signal or the synchronization signal from different cells, to find the cells with the strongest received signal. The synchronization signal is also used to determine the cell identity and the frame timing of the found cell as well as the parameters needed for receiving the broadcast channel information. The cell search delay is the time needed for the UE to find and identify a cell. An initial cell search is performed after power up of a UE, whereas neighbor cell search is used to identify candidate target cells for a handover. Neighbor cell search is performed both in connected mode when the UE receives downlink data from the network and in idle mode.

In a CoMP system, common channel signals such as synchronization signals and reference signals, are identically transmitted from all sub base stations in a CoMP cell, which means that they are common to all sub cells in the same CoMP cell. The common synchronization signal will for instance allow UEs to determine a CoMP cell identity (at CoMP cell search). Additional synchronization and reference signals specific to each sub cell may also be transmitted in a conventional CoMP system, to enable UEs to uniquely identify each sub cell in a CoMP cell (at sub cell search). The sub cell identities may be reused in neighboring CoMP cells. Thus a sub cell must be identified by a combination of the CoMP cell identity and the sub cell identity.

A UE is typically served by multiple sub cells, belonging to one serving CoMP cell. The coordinated transmission from multiple sites increases the reliability and reduces the inter-cell interference. One of the roles of the controlling unit in a conventional CoMP system, is to coordinate the transmission from the sub cells, in order to get an optimal system performance. To be able to do this, the UE is required to find and identify sub cells appropriate for its transmission and reception in the CoMP cell (i.e. perform a sub cell search) and report the identified sub cells to the controlling unit.

In a network comprising multiple CoMP cells, the UEs will also move between different CoMP cells. Thus handover has to be supported between CoMP cells, and the CoMP cells are regularly searched to identify the list of candidate target CoMP cells. In order to prevent increased inter-cell interference and lowered performance after a handover from a serving to a target CoMP cell, the target CoMP cell should immediately start serving the UEs from multiple sub cells. This can be realized by letting the serving CoMP cell provide the target CoMP cell with a list of the "strongest" sub cells of the target CoMP cell (i.e. the ones providing the strongest signal) at the time of handover. The UE must thus search the sub cells of each candidate target CoMP cells regularly, and must transmit the identities of the strongest candidate target CoMP cells and the identities of their corresponding strongest sub cells to the serving CoMP cell. In this way the target CoMP cell can resume the transmission to the UE from the strongest sub cells at handover without any additional delay.

The conventional cell search procedure of a UE in connected mode doing a handover from a serving to a target CoMP cell is described hereafter with reference to FIG. 2. A UE 230 is served by a serving CoMP cell 210 and a number of sub cells 220 within this serving CoMP cell 210. The UE 230 will continuously measure the signal strength received from neighboring CoMP cells and based on these measurements transmit a list of the strongest neighboring CoMP cells—i.e. the candidate target CoMP cells 240a-b—to the serving CoMP cell 210. For each one of the candidate target CoMP cells 240a-b, the UE 230 will also do a sub cell search and transmit the identities of the found strongest sub cells (i.e. the target sub cells 250a-b) to the serving CoMP cell 210. This means that at handover from the serving CoMP cell 210 to the candidate target CoMP cell 240a that has been identified as the actual target CoMP cell, the serving CoMP cell 210 can transmit the identities of the target sub cells 250a to the target CoMP cell 240a at once, and the transmission can continue with a minimal disturbance.

The reason for doing a sub cell search in all candidate target CoMP cells is thus to optimize the performance immediately after a handover. If no sub cell search is performed in the candidate target CoMP cells, the CoMP cell that is selected as the target CoMP cell at handover will not be able to assign a set of best sub cells for transmission immediately after the handover. Instead the target CoMP cell will select the sub cells based on uplink transmission from the UE, e.g. RACH transmission, during handover. However due to short RACH burst reception, the selection of sub cells may not be reliable, and the target CoMP cell will then have to reallocate the sub cells when it has received a more reliable signal from the UE. The drawback with performing no sub cell searches at all and instead relying on the RACH transmission, is that the interference in a CoMP cell will increase until correct sub cells are assigned to the UE. In addition the user throughput will degrade due to the delay in the selection of the desired set of sub cells.

The drawback with continuous sub cell searches in all the candidate target CoMP cells is that it will require the UE to perform a large amount of parallel cell searches and to maintain a very long list of sub cell identities. This will increase the UE complexity as more hardware for e.g. processing and storage is needed. Furthermore, when the UEs employ DRX and are in idle mode, the continuous cell search will drain the UE battery.

A further disadvantage with continuous sub cell searches is that the signaling load on the uplink and consequently the processing at the serving CoMP cell is important, as all the sub cell identities need to be transmitted to the controlling unit.

SUMMARY

The object of the present invention is to achieve methods and arrangements that obviate some of the above disadvantages and enable the UE to limit the number of sub cell searches needed in a system with CoMP cells, while keeping an acceptable system performance at handovers. This is achieved by a solution where the UE performs a sub cell search in a candidate target CoMP cell only when certain conditions comparing a CoMP cell quality performance measure with a threshold value is fulfilled.

Thus in accordance with a first aspect of the present invention, a method for cell search for a user equipment in a wireless communication system with CoMP cells is provided. The user equipment is served by a serving CoMP cell. A CoMP cell comprises a controlling unit and at least two sub cells, each sub cell transmitting at least a CoMP cell specific synchronization signal and a sub cell specific synchronization signal. The method comprises the steps of searching the CoMP cells, finding at least one candidate target CoMP cell and determining the identity of the found candidate target CoMP cell based on at least the CoMP cell specific synchronization signal. The method is characterized by the further steps of determining whether at least one condition comparing a CoMP cell quality performance measure with a threshold value is fulfilled, and initiating a sub cell search at a specified rate in the found candidate target CoMP cell, when the at least one condition comparing a CoMP cell quality performance measure with a threshold value is fulfilled.

In accordance with a second aspect of the present invention, a method for cell search for a controlling unit of a CoMP cell in a wireless communication system is provided. The CoMP cell serves at least one user equipment, and the controlling unit manages a list of candidate target CoMP cells. The method comprises the step of transmitting at least one threshold value to the user equipment, where the threshold value is used by the user equipment for determining when a sub cell search should be initiated in a candidate target CoMP cell.

In accordance with a third aspect of the present invention, a user equipment in a wireless communication system with CoMP cells is provided, where the user equipment is served by a serving CoMP cell. A CoMP cell comprises a controlling unit and at least two sub cells, each sub cell transmitting at least a CoMP cell specific synchronization signal and a sub cell specific synchronization signal. The user equipment comprises means for searching the CoMP cells, and means for finding at least one candidate target CoMP cell. It also comprises means for determining the identity of the found candidate target CoMP cell based on at least the CoMP cell specific synchronization signal. The user equipment is characterized by further means for determining whether at least one condition comparing a CoMP cell quality performance measure with a threshold value is fulfilled, and means for initiating a sub cell search at a specified rate in the found candidate target CoMP cell when the at least one condition comparing a CoMP cell quality performance measure with a threshold value is fulfilled.

In accordance with a fourth aspect of the present invention, a controlling unit of a CoMP cell in a wireless communication system, where the CoMP cell serves at least one user equipment, is provided. The controlling unit is adapted to manage a list of candidate target CoMP cells. It comprises means for transmitting at least one threshold value to the user equipment, where the threshold value is used by the user equipment for determining when a sub cell search should be initiated in a candidate target CoMP cell.

An advantage of embodiments of the present invention is that they allow for reduced complexity in terms of processing and storage in the UE, since the UE will perform a sub cell search in a candidate target CoMP cell only when a certain condition or certain conditions are fulfilled. The signaling load in the uplink and consequently processing at the serving CoMP cell will also be reduced since the UE will report a less amount of sub cells. A further advantage is that UEs in idle mode employing DRX, will save power and thus battery life time due to the reduced processing for cell search.

DETAILED DESCRIPTION

Figure 1:
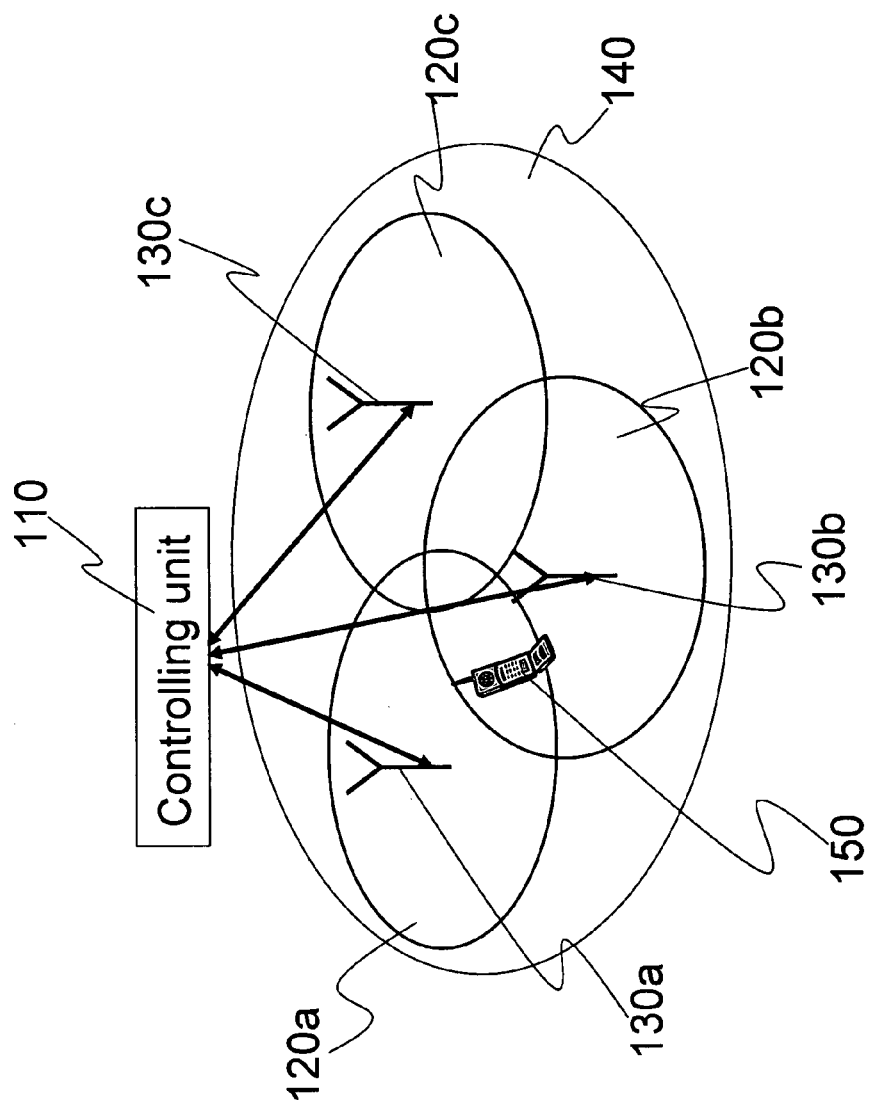
FIG. 1 illustrates schematically the basic concepts of a conventional CoMP system.
Figure 2:
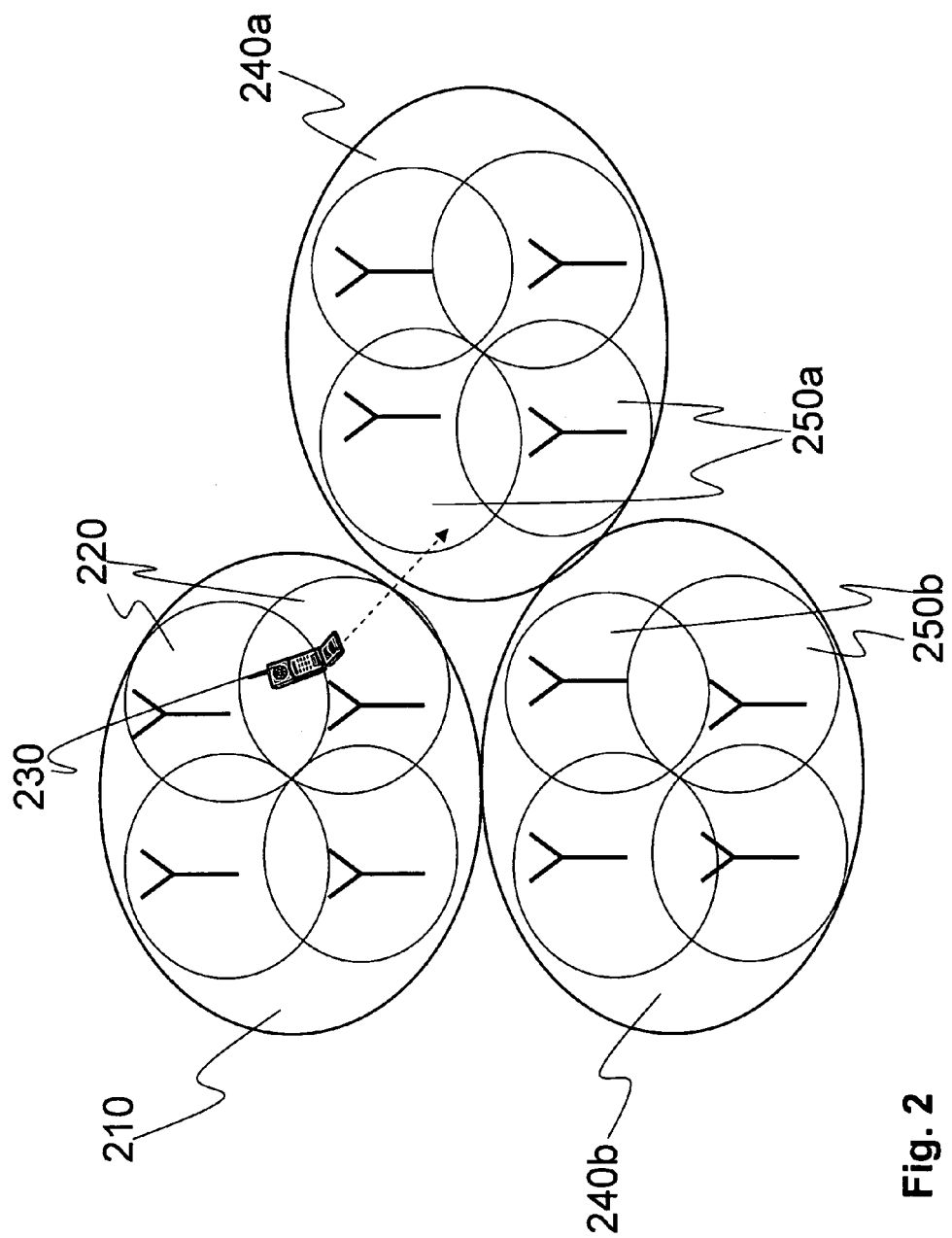
FIG. 2 illustrates schematically a part of a conventional wireless communication system with CoMP cells wherein the present invention may be implemented.

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to an LTE-advanced system. However, it should be noted that the invention and its exemplary embodiments may also be applied to other types of wireless communication systems employing a CoMP system architecture.

As described above, a CoMP cell may comprise several sub cells, typically around ten sub cells. A conventional CoMP cell search thus results in a very large number of sub cell searches for a UE, as the sub cells are always searched. The purpose of the present invention is to limit the number of sub cell searches in the system by enabling the UE to search sub cells only when one or more conditions comparing a CoMP cell quality performance measure with a threshold value are fulfilled. This will reduce the UE complexity, while still keeping a certain amount of sub cell searches to obtain a good performance at handover.

The term cell quality performance measure refers to various downlink measurements performed by the UE. It is thus a generic term covering various aspects of cell quality performance. Some well known examples of performance measures are the cell search delay, received signal level or quality of the synchronization signals, reference signal received power (RSRP), reference signal received quality (RSRQ), signal to interference plus noise ratio of reference signal (RS SINR) etc. The RSRP and RSRQ are downlink measures used in E-UTRAN and LTE-advanced for mobility i.e. performing cell reselection and handover, and are therefore measured from the serving as well as the neighbor cells.

In the present invention, the UE will regularly search neighboring CoMP cells by comparing their synchronization signals (coherently sent by all sub cells in a CoMP cell). The UE will thus find, identify and maintain a list of the strongest neighboring CoMP cells, i.e. the candidate target CoMP cells. For each of the candidate target CoMP cells, the UE will decide if a sub cell search should be initiated, based on if one or several conditions related to a CoMP cell quality performance are fulfilled. In a first embodiment of the present invention, a sub cell search is performed at a specified rate if one or more conditions are fulfilled. Otherwise no sub cell search is performed at all. The advantage of this first embodiment of the present invention, is that it allows for reduced complexity in terms of processing and storage in the UE, since the UE will do sub cell search in a candidate target CoMP cell only when a certain condition or certain conditions are fulfilled, instead of always performing sub cell searches.

In a second embodiment of the present invention, the UE will perform a sub cell search at the specified search rate when one or more of the conditions are fulfilled as described above in the first embodiment, but when none of the conditions are fulfilled the UE will still perform a sub cell search but at some search rate lower than the specified search rate. This means that a sub cell search will be performed in all candidate target CoMP cells, but at different search rates depending on the quality performance of the CoMP cell. A lower sub cell search rate implies less processing in the UE and thus less complexity, although still higher than in the previously described first embodiment. At the same time this second embodiment will provide a somewhat better handover performance, as a sub cell search is always done for all candidate target CoMP cells. A trade off between the UE complexity and the handover performance has to be done.

In one embodiment of the present invention, the conditions related to a CoMP cell quality performance (i.e. conditions comparing a CoMP cell quality performance measure with a threshold value) are defined as one or more of the conditions 1-4 described below. The CoMP cell quality performance measure represents both received signal quality (in conditions 1, 2 and 4) and cell search delay (condition 3):

Condition 1: The received signal quality (e.g. signal to interference plus noise ratio SINR) from the candidate target CoMP cell is above a first threshold value, i.e. the candidate target CoMP cell quality is probably good enough to be the serving cell at a handover, and a sub cell search at the specified rate should be performed for this CoMP cell.

Condition 2: The difference between the received signal quality from the candidate target CoMP cell and the serving CoMP cell is above a second threshold value. The UE regularly calculates the difference between the received signal quality of the candidate target CoMP cell with that of the serving CoMP cell and compares the difference with a threshold value. If the difference is above a threshold value the candidate target CoMP cell has a better quality than the serving CoMP cell and is probably good enough to be the serving cell at handover. A sub cell search should thus be performed at the specified search rate for this candidate target CoMP cell.

Condition 3: The cell search delay for the candidate target CoMP cell is below a third threshold value. In this case, the UE keeps track of the time used for the CoMP cell search (i.e. the cell search delay). The cell search delay is a measure of the candidate target CoMP cell quality as it increases with the decrease of the quality of the received synchronization signal. A longer cell search delay would thus imply a weak candidate target CoMP cell which means that a sub cell search may not be urgently needed or can be performed at a lower search rate. But if the cell search delay is shorter than the threshold, a sub cell search should be performed at the specified search rate for this CoMP cell.

Condition 4: The received signal quality from the serving CoMP cell is below a fourth threshold value. If this condition is fulfilled, a sub cell search should be done at the specified search rate in all candidate target CoMP cells.

These four conditions are based on the idea that if the CoMP cell quality—which is based on the quality of signals received from all sub cells—is poor, then it is also likely that the quality of the sub cells is poor.

In further embodiments of the present invention, the received signal quality measured to determine if the conditions 1, 2 or 4 above are fulfilled, is the quality of a suitable common channel signals transmitted by a CoMP cell, i.e. the synchronization signal or the reference signal, or a combination of both. In the latter embodiment, the UE compares the quality of more than one signal, i.e. the quality of both the reference signal (QT_RS) and the synchronization signal (QT_SS). Mathematically expressed this will give:

$$QT\_RS > \alpha \text{ AND } QT\_SS > \Omega \qquad (1)$$

where $\alpha$ and $\Omega$ are the threshold values. Alternatively, the broadcast channel signal could also be used.

In an embodiment of the present invention the sub cell search that is initiated in some (or all) candidate target CoMP cells, comprises the steps of the UE searching the sub cells and finding the target sub cells of the CoMP cells. The target sub cells corresponds to the sub cells from which the UE receives signals with the highest signal strength and which are thus best suited to serve the UE in the candidate target CoMP cell. The next step is that the UE determines the identity of each of the target sub cells with the help of the sub cell specific synchronization signal. The last step is that the UE transmits the identity of the candidate target CoMP cell together with the identity of the target sub cells to the controlling unit of the serving CoMP cell, to uniquely identify the target sub cells. In this way the serving CoMP cell has all the information needed for an optimal performance at handover to the candidate target CoMP cells where the sub cell search has been performed.

In a further embodiment of the present invention, the different threshold values used in the conditions 1-4 above are determined by the UE. In an alternative embodiment the thresholds are transmitted from the network to the UE, via the controlling unit. In yet another alternative embodiment the thresholds are pre-defined in the UE.

Figure 4A:
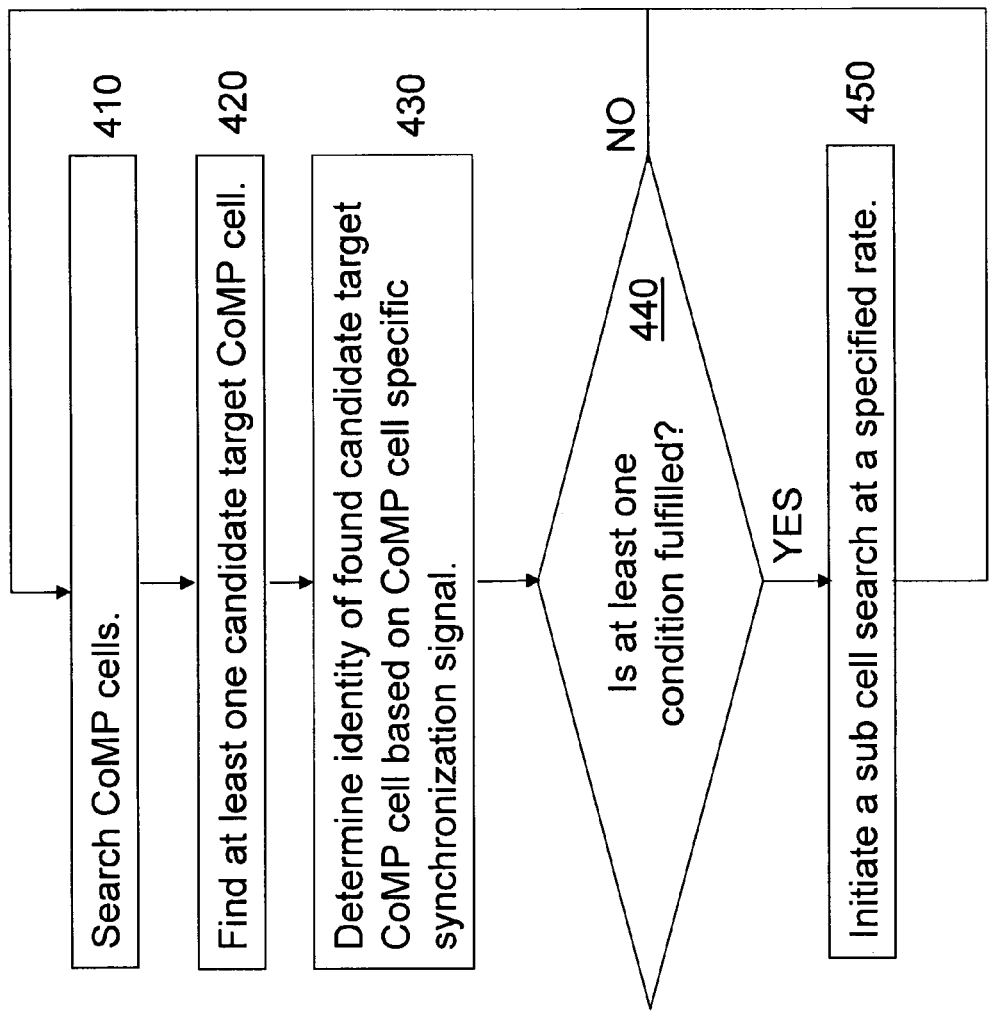
FIGS. 4a, 4b and 4c are flowcharts of the method of the UE according to embodiments of the present invention.

FIG. 4a is a flowchart of the method for the UE, according to the first embodiment of the present invention, as described above. It comprises the following steps, performed by the UE:
  410: Search the CoMP cells, in order to find the candidate target CoMP cells.
  420: Find one or more candidate target CoMP cells, wherein the candidate target CoMP cells are the CoMP cells from which the UE receives the highest signal strength.
  430: Determine the identity of the candidate target CoMP cell based on at least the CoMP cell specific synchronization signal. In E-UTRAN, a cell search may be based only on the synchronization signal, but in addition common reference signals (similar to the Common Pilot Channel (CPICH) in UTRAN) can also be used to further improve the cell search performance.
  440: Determine if any of the conditions comparing the CoMP cell quality performance measure with a threshold value are fulfilled.
  450: If yes (at least one condition fulfilled), initiate a sub cell search at a specified rate in the found candidate target CoMP cell.

In this embodiment, no sub cell search is initiated if none of the conditions are fulfilled.

Figure 4B:
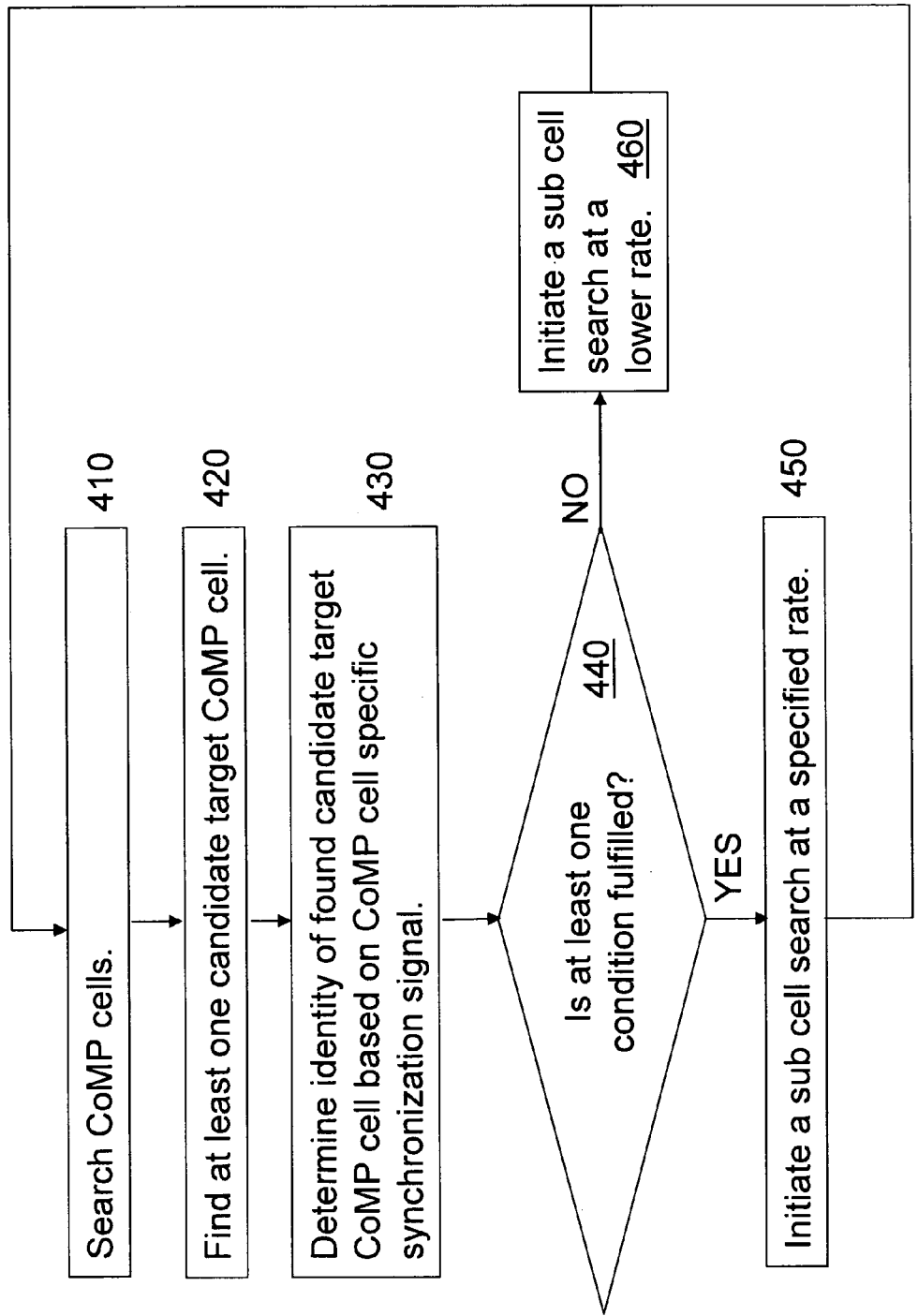

FIG. 4b is a flowchart of the method for the UE, according to the second embodiment of the present invention, as described above. It comprises the same steps 410-450 as the first embodiment illustrated in the flowchart of FIG. 4a, but it also comprises the step of initiating 460 a sub cell search at a rate lower than the specified rate, when none of the conditions are fulfilled.

Figures 4C, 5:
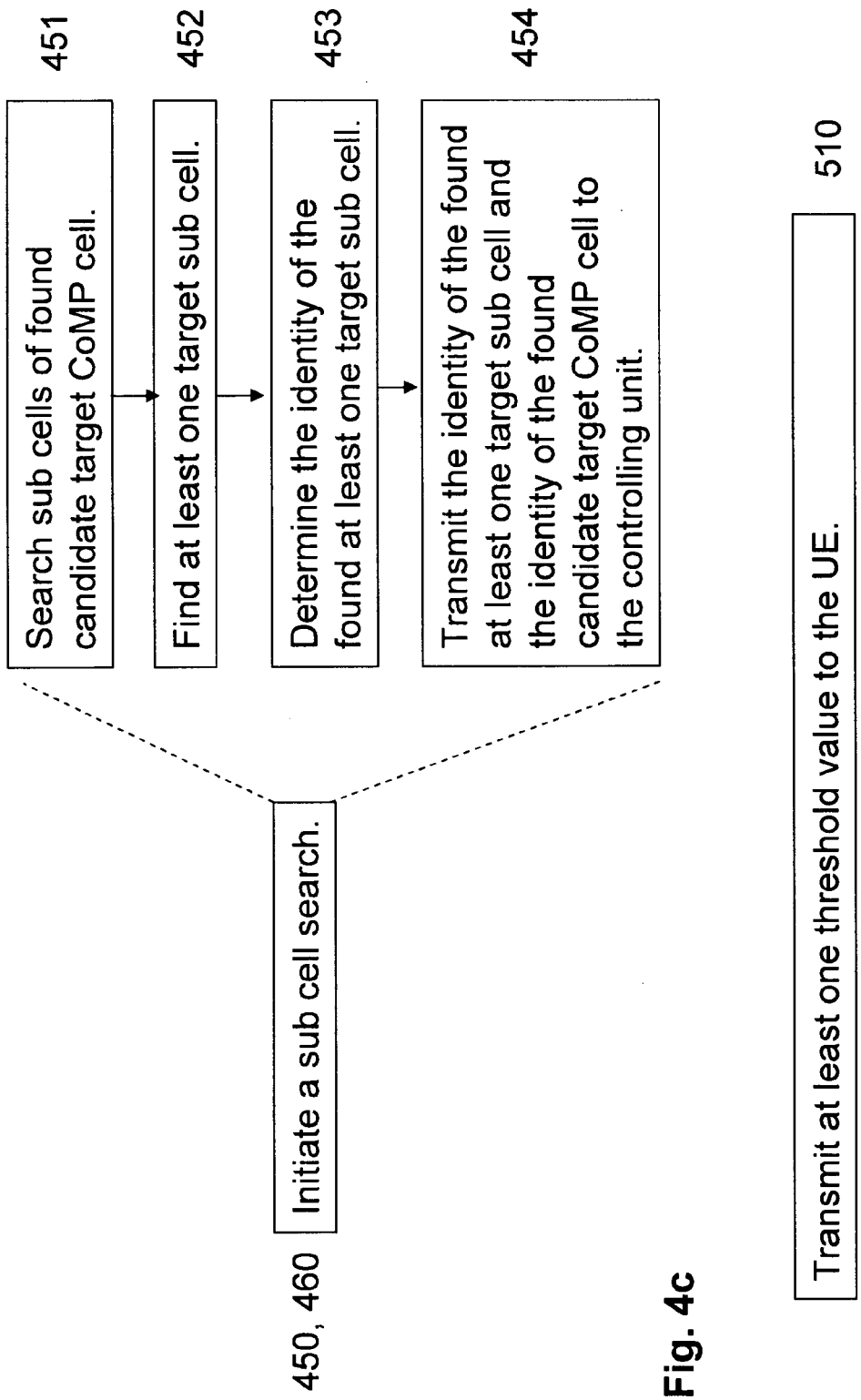
FIG. 5 is a flowchart of the method of the controlling unit according to embodiments of the present invention.

According to another embodiment of the present invention, steps 450 and 460 comprises the method steps illustrated in the flowchart in FIG. 4c, performed by the UE. The steps are:
  451: Search the sub cells of the found candidate target CoMP cell.
  452: Find the target sub cells of this CoMP cell.
  453: Determine the identity of the found target sub cells based on at least the sub cell specific synchronization signal (similarly to the CoMP cell search).
  454: Transmit the identity of the found target sub cell and the identity of the corresponding candidate target CoMP cell to the controlling unit in the serving CoMP cell. Both sub cell identity and CoMP cell identity is needed to uniquely identify the sub cell, as described previously.

Furthermore, FIG. 5 is a flowchart of the method for the controlling unit, according to one embodiment of the present invention. It comprises the step of transmitting 510 at least one threshold value to the user equipment. This threshold value is used by the user equipment for determining if a sub cell search should be initiated in a candidate target CoMP cell.

Figure 3:
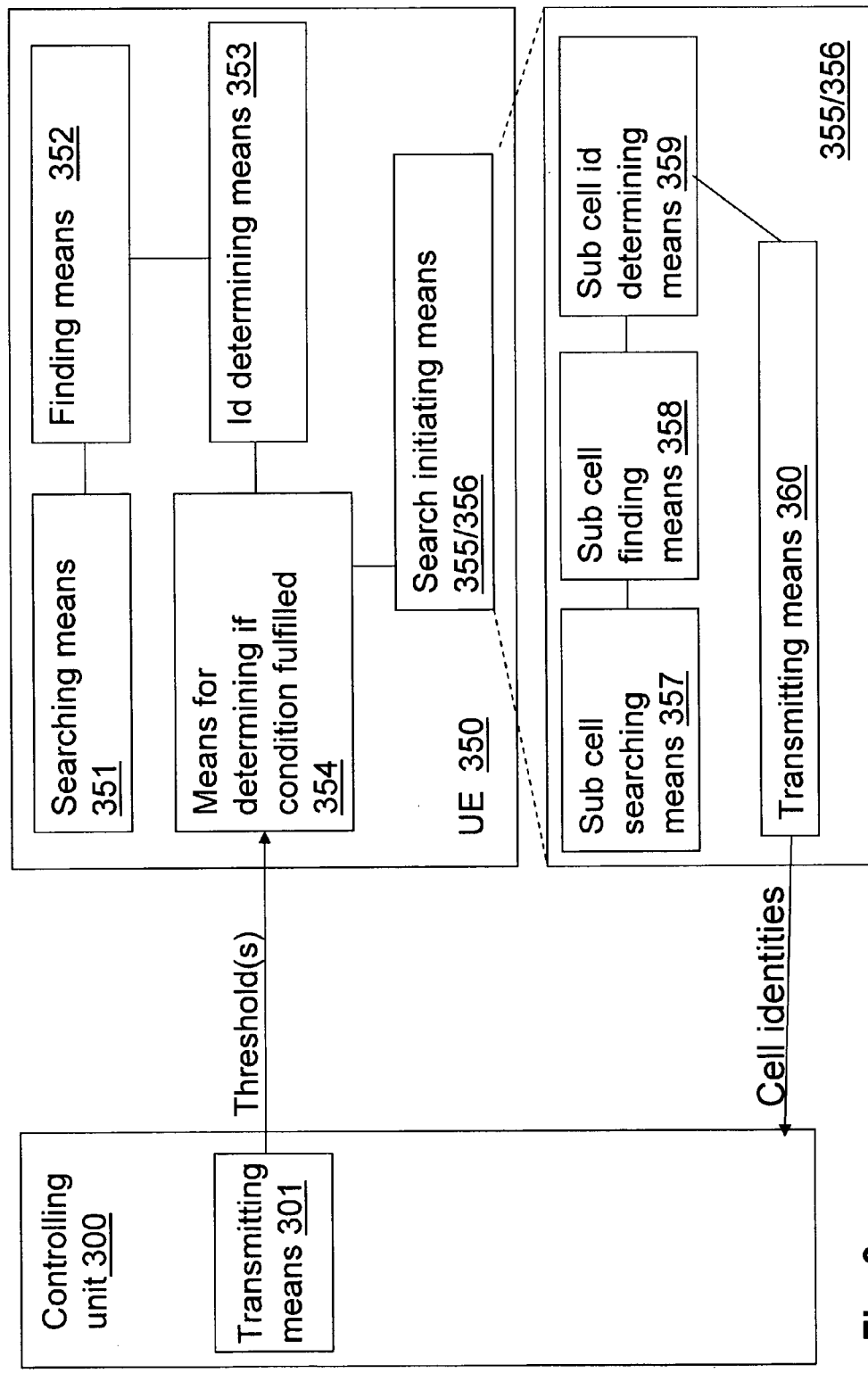
FIG. 3 is a block diagram schematically illustrating the controlling unit and the UE according to embodiments of the present invention.

Schematically illustrated in the block diagram of FIG. 3 and according to embodiments of the present invention, the UE 350 comprises means for searching 351 the CoMP cells. It also comprises means for finding 352 at least one candidate target CoMP cell, and means for determining 353 the identity of this CoMP cell based on the CoMP cell specific synchronization signal. The UE also comprises means for determining 354 whether one or more conditions comparing CoMP cell quality performance measures with threshold values are fulfilled.

The UE further comprises means for initiating 355/356 a sub cell in the found candidate target CoMP cell. According to the first embodiment of the present invention (as described above), a specified search rate is used if any of the conditions are fulfilled 355. According to the second embodiment, a specified search rate is used if any of the conditions are fulfilled 355 and a search rate lower than the specified one is used when none of the chosen conditions are fulfilled 356.

Also illustrated in FIG. 3 and according to one embodiment of the present invention, are the means for initiating 355/356 a sub cell search, which comprises means for searching 357 the sub cells of the found candidate target CoMP cell, means for finding 358 at least one target sub cell, and means for determining 359 the identity of the found at least one target sub cell based on at least the sub cell specific synchronization signal. The means for initiating 355/356 a sub cell search also comprises means for transmitting 360 the identity of the found target sub cell and the identity of the corresponding candidate target CoMP cell to the controlling unit in the serving CoMP cell.

Further illustrated in FIG. 3 is the controlling unit 300. It comprises means for transmitting 301 at least one threshold value to the user equipment. The controlling unit 300 is in one embodiment configured to be placed in a base station and in another embodiment it is configured to be placed in a centralized controller.

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method of cell search for a user equipment in a wireless communication system with Coordinated Multiple Point transmission/reception (CoMP) cells, wherein the user equipment is served by a serving CoMP cell, and wherein a CoMP cell comprises a controlling unit and at least two sub cells, each sub cell transmitting at least a CoMP cell specific synchronization signal and a sub cell specific synchronization signal, said method comprising:
   searching CoMP cells neighboring the serving CoMP cell for at least one candidate target CoMP cell,
   determining the identity of a found candidate target CoMP cell based on at least the CoMP cell specific synchronization signal,
   determining whether at least one condition, comparing a CoMP cell quality performance measure for the found candidate target CoMP cell with a threshold value, is fulfilled, and
   initiating a sub cell search at a specified rate in the found candidate target CoMP cell when the at least one condition is fulfilled.

2. The method according to claim 1, further comprising:
   initiating a sub cell search at a rate lower than the specified rate in the found candidate target CoMP cell when the at least one condition is not fulfilled.

3. The method according to claim 1, wherein the at least one condition is at least one of:
   a first condition where a received signal quality from the found candidate target CoMP cell is above a first threshold value,
   a second condition where a difference between the received signal quality from the found candidate target CoMP cell and a received signal quality from the serving CoMP cell is above a second threshold value,
   a third condition where a cell search delay of the found candidate target CoMP cell is below a third threshold value, and
   a fourth condition where the received signal quality from the serving CoMP cell is below a fourth threshold value.

4. The method according to claim 3, wherein a received signal quality is at least one of a received reference signal quality and a received synchronization signal quality.

5. The method according to claim 3, wherein at least one of the first, second, third and fourth threshold value is determined by the user equipment.

6. The method according to claim 3, wherein at least one of the first, second, third and fourth threshold value is received from the controlling unit.

7. The method according to claim 3, wherein at least one of the first, second, third and fourth threshold value is predefined in the UE.

8. The method according to claim 1, wherein initiating a sub cell search comprises:
   searching the sub cells of the found candidate target CoMP cell for at least one target sub cell,
   determining the identity of the found at least one target sub cell based on at least the sub cell specific synchronization signal, and
   transmitting the identity of the found at least one target sub cell and the identity of the found candidate target CoMP cell to the controlling unit of the serving CoMP cell.

9. A method of cell search for a controlling unit of a Coordinated Multiple Point transmission/reception (CoMP) cell in a wireless communication system comprising a plurality of CoMP cells, each CoMP cell comprising at least two sub cells, wherein the CoMP cell controlled by said controlling unit serves at least one user equipment, and wherein the controlling unit manages a list of candidate target CoMP cells, said method comprising transmitting to the at least one user equipment at least one threshold value that supports a determination of when a sub cell search should be initiated in a candidate target CoMP cell.

10. The method according to claim 9, wherein the at least one threshold value is at least one of:
    a first threshold value for a received signal quality from the candidate target CoMP cell,
    a second threshold value for a difference between the received signal quality from the candidate target CoMP cell and a received signal quality from said CoMP cell serving the at least one user equipment,
    a third threshold value for a cell search delay of the candidate target CoMP cell, and
    a fourth threshold value for the received signal quality from said CoMP cell serving the at least one user equipment.

11. The method according to claim 10, wherein the received signal quality is at least one of a received reference signal quality and a received synchronization signal quality.

12. A user equipment in a wireless communication system with Coordinated Multiple Point transmission/reception (CoMP) cells, wherein the user equipment is served by a serving CoMP cell, wherein a CoMP cell comprises a controlling unit and at least two sub cells, each sub cell transmitting at least a CoMP cell specific synchronization signal and a sub cell specific synchronization signal, said user equipment comprising one or more processors configured to:
   search CoMP cells neighboring the serving CoMP cell for at least one candidate target CoMP cell,
   determine the identity of a found candidate target CoMP cell based on at least the CoMP cell specific synchronization signal,
   determine whether at least one condition, comparing a CoMP cell quality performance measure for the found candidate target CoMP cell with a threshold value, is fulfilled, and
   initiate a sub cell search at a specified rate in the found candidate target CoMP cell when the at least one condition is fulfilled.

13. The user equipment according to claim 12, wherein the one or more processors are further configured to initiate a sub cell search at a rate lower than the specified rate in the found candidate target CoMP when the at least one condition is not fulfilled.

14. The user equipment according to claim 12, wherein the at least one condition is at least one of:
    a first condition where a received Signal quality from the found candidate target CoMP cell is above a first threshold value,
    a second condition where a difference between the received signal quality from the found candidate target CoMP cell and a received signal quality from the serving CoMP cell is above a second threshold value, a third condition where a cell search delay of the found candidate target CoMP cell is below a third threshold value, and a fourth condition where the received signal quality from the serving CoMP cell is below a fourth threshold value.

15. The user equipment according to claim 14, wherein a received signal quality is at least one of a received reference signal quality and a received synchronization signal quality.

16. The user equipment according to claim 14, wherein at least one of the first, second, third and fourth threshold value is determined by the user equipment.

17. The user equipment according to claim 14, wherein at least one of the first, second, third and fourth threshold value is received from the controlling unit.

18. The user equipment according to claim 14, wherein at least one of the first, second, third and fourth threshold value is pre-defined in the UE.

19. The user equipment according to claim 12, wherein the one or more processors are configured to initiate a sub cell search by:

searching the sub cells of the found candidate target CoMP cell for at least one target sub cell, determining the identity of a found at least one target sub cell based on at least the sub cell specific synchronization signal, and transmitting the identity of the found at least one target sub cell and the identity of the found candidate target CoMP cell to the controlling unit of the serving CoMP cell.

20. A controlling unit of a Coordinated Multiple Point transmission/reception (CoMP) cell in a wireless communication system comprising a plurality of CoMP cells, each CoMP cell comprising at least two sub cells, wherein the CoMP cell controlled by said controlling unit serves at least one user equipment, and wherein the controlling unit comprises one or more processors configured to:

manage a list of candidate target CoMP cells, and transmit to the at least one user equipment at least one threshold value that supports a determination of when a sub cell search should be initiated in a candidate target CoMP cell.

21. The controlling unit according to claim 20, wherein the at least one threshold value is at least one of:

a first threshold value for a received signal quality from the candidate target CoMP cell, a second threshold value for a difference between the received signal quality from the candidate target CoMP cell and a received signal quality from said CoMP cell serving the at least one user equipment, a third threshold value for a cell search delay of the candidate target CoMP cell, and a fourth threshold value for the received signal quality from said CoMP cell serving the at least one user equipment.

22. The controlling unit according to claim 21, wherein a received signal quality is at least one of a received reference signal quality and a received synchronization signal quality.

23. The controlling unit according to claim 20, wherein the controlling unit is comprised in a base station.

24. The controlling unit according to claim 20, wherein the controlling unit is comprised in a controller configured to control a plurality of sub base stations in the CoMP cell.

* * * * *